(12) United States Patent
Fiello et al.

(10) Patent No.: US 11,548,394 B2
(45) Date of Patent: Jan. 10, 2023

(54) WING STABILIZER CHARGING SYSTEM

(71) Applicant: K&N Engineering, Inc., Riverside, CA (US)

(72) Inventors: Jonathan Richard Fiello, Yucaipa, CA (US); Steve Williams, Cherry Valley, CA (US)

(73) Assignee: K&N Engineering, Inc., Riverside, CA (US)

( * ) Notice: Subject to any disclaimer, the term of this patent is extended or adjusted under 35 U.S.C. 154(b) by 233 days.

(21) Appl. No.: 16/912,072

(22) Filed: Jun. 25, 2020

(65) Prior Publication Data
US 2020/0406760 A1    Dec. 31, 2020

Related U.S. Application Data

(60) Provisional application No. 62/866,725, filed on Jun. 26, 2019.

(51) Int. Cl.
| | | |
|---|---|---|
| *F03D 9/00* | (2016.01) | |
| *B60L 8/00* | (2006.01) | |
| *F03D 9/32* | (2016.01) | |
| *B62D 35/00* | (2006.01) | |
| *B60L 50/60* | (2019.01) | |

(52) U.S. Cl.
CPC ............ *B60L 8/006* (2013.01); *F03D 9/32* (2016.05); *B60L 50/60* (2019.02); *B62D 35/007* (2013.01); *H02J 2300/28* (2020.01)

(58) Field of Classification Search
CPC .......... B60L 8/006; B60L 50/60; B60L 53/00; B62D 35/007; F03D 9/25; F03D 9/32; H02K 7/183; H02J 2300/28; H02J 3/381; H02J 2310/48; H02J 7/0042; F05B 2240/941; B60K 2016/006; Y02T 10/90; Y02T 10/64

See application file for complete search history.

(56) References Cited

U.S. PATENT DOCUMENTS

| | | | | |
|---|---|---|---|---|
| 4,419,587 | A * | 12/1983 | Benton | ..................... F03D 7/06 416/17 |
| 6,373,145 | B1 * | 4/2002 | Hamrick | ................... F03D 9/25 290/55 |
| 2008/0150289 | A1 * | 6/2008 | Fein | ........................ H02J 3/382 290/55 |
| 2013/0043687 | A1 * | 2/2013 | Tai | ........................... F03D 5/00 290/55 |

* cited by examiner

*Primary Examiner* — Julio C. Gonzalez
(74) *Attorney, Agent, or Firm* — Rutan & Tucker LLP; Hani Z. Sayed

(57) ABSTRACT

A system and methods are provided for a wing stabilizer charging system for recharging onboard batteries during operation of an electrically powered vehicle. The wing stabilizer charging system comprises a wing stabilizer configured to be coupled with a rear of the vehicle. One or more air inlets are disposed in the wing stabilizer and configured to receive an airstream during forward motion of the vehicle. Wind turbines are disposed within the wing stabilizer and configured to be turned by the airstream. A circuit box is configured to combine electricity received from the wind turbines into a useable electric current. A power cable extends from the circuit box and is configured to supply the useable electric current to any one or more electronic devices, such as any of an onboard battery for powering the vehicle, mobile phones or smart phones, portable music players, tablet computers, cameras, and the like.

20 Claims, 1 Drawing Sheet

WING STABILIZER CHARGING SYSTEM

PRIORITY

This application claims the benefit of and priority to U.S. Provisional Application, entitled "Wing Stabilizer Charging System," filed on Jun. 26, 2019 and having application Ser. No. 62/866,725, the entirety of said application being incorporated herein by reference.

FIELD

Embodiments of the present disclosure generally relate to the field of electrically powered vehicles. More specifically, embodiments of the disclosure relate to a wing stabilizer charging system and methods for recharging onboard batteries during operation of an electrically powered vehicle.

BACKGROUND

Electrically powered vehicles generally solve problems associated with the gasoline-powered vehicles, such as environmental pollution, noise and depletion of crude oil reserves due to the increasing use of gasoline-powered vehicles. As such, electrically powered vehicles are gaining in popularity and their use is becoming increasingly widespread. Unfortunately, electrically powered vehicles have certain drawbacks, including limited travel range between battery recharging and excessive time required for recharging the batteries. In generally, the average travel distance between battery recharging for currently available electrically powered vehicles is considerably less than the driving range of gasoline powered vehicles. Further, several hours may be required to recharge the batteries while the vehicle remains inoperative.

Increasing the driving range of electrically powered vehicles between battery recharging downtimes can significantly increase the desirability of operating electrically powered vehicles. One approach to increasing the driving range of electrically powered is by charging the batteries while the vehicle is in motion, such as by way of utilizing air currents as a motive power. Although there have been many contributions to the art of electrically powered vehicles, significant improvements are needed to solve the short travel distance problems associated with such vehicles. There is a continuing interest, therefore, in developing battery recharging systems capable of extending the driving range of electrically powered vehicles during vehicle operation.

SUMMARY

A system and methods are provided for a wing stabilizer charging system for recharging onboard batteries during operation of an electrically powered vehicle. The wing stabilizer charging system comprises a wing stabilizer configured to be coupled with a rear of the vehicle. One or more air inlets are disposed in the wing stabilizer and configured to receive an airstream during forward motion of the vehicle. Wind turbines are disposed within the wing stabilizer and configured to be turned by the airstream. A circuit box is configured to combine electricity received from the wind turbines into a useable electric current. A power cable extends from the circuit box and is configured to supply the useable electric current to any one or more electronic devices, such as any of an onboard battery for powering the vehicle, mobile phones or smart phones, portable music players, tablet computers, cameras, and the like.

In an exemplary embodiment, a charging system for a vehicle comprises: a wing stabilizer comprising a hollow wing-shaped member including an interior chamber; one or more air inlets disposed in the wing stabilizer and configured to receive an airstream into the chamber during forward motion of the vehicle; a vertical support disposed near each end of the wing stabilizer and mounted to a rear of the vehicle; an air passage within each vertical support and in fluid communication with the chamber; a wind turbine disposed within the air passage and configured to be turned by the airstream; and a power cable configured to direct an electric current from the wind turbine to one or more electronic devices that are configured to utilize the electric current.

In another exemplary embodiment, the one or more electronic devices comprises any of an onboard battery for powering the vehicle, mobile phones or smart phones, portable music players, tablet computers, cameras, and the like. In another exemplary embodiment, the wing stabilizer includes a shape and size suitable for being coupled with the rear of the vehicle. In another exemplary embodiment, the wing stabilizer includes multiple mounting holes for receiving hardware fasteners suitable for attaching the wing stabilizer to the rear of the vehicle.

In another exemplary embodiment, the one or more air inlets are disposed side-by-side along the width of the wing stabilizer. In another exemplary embodiment, each pair of adjacent air inlets shares an intervening separator that is configured to contribute to the structural integrity of the wing stabilizer and to operate in combination with the one or more air inlets to reduce air turbulence. In another exemplary embodiment, one or more air outlet ports are disposed at a bottom of each vertical support and configured to allow the airstream to exit the wing stabilizer.

In another exemplary embodiment, the wind turbine includes multiple blades coupled with a hub that is in mechanical communication with an electric generator. In another exemplary embodiment, the multiple blades generally are arranged in a cylindrical configuration. In another exemplary embodiment, each of the multiple blades includes a scooped cross-sectional shape that extends along the length of the blade. In another exemplary embodiment, the multiple blades are configured to turn the electric generator in response to the airstream entering through the one or more air inlets and exiting through one or more air outlet ports at a bottom of the vertical support.

In another exemplary embodiment, the charging system further includes a circuit box configured to combine the electric current from one or more electric generators into a combined, useable electric current. In another exemplary embodiment, the charging system further includes a power cable extending from the circuit box and configured to direct the useable electric current to the one or more electronic devices.

In an exemplary embodiment, a method for a charging system for a vehicle comprises: configuring a wing stabilizer comprising a hollow wing-shaped member that includes an interior chamber; disposing one or more air inlets in the wing stabilizer; configuring the one or air inlets to direct an airstream into the chamber during forward motion of the vehicle; disposing a vertical support near each end of the wing stabilizer; configuring the vertical support to be mounted to a rear of the vehicle; placing an air passage within each vertical support into fluid communication with the chamber; disposing a wind turbine within the air passage; configuring the wind turbine to be turned by the airstream; and configuring a power cable to direct an electric current from the wind turbine to one or more electronic devices that are configured to utilize the electric current.

In another exemplary embodiment, configuring the wind turbine includes configuring multiple blades to turn an electric generator in response to the airstream entering through the one or more air inlets and exiting through the one or more air outlet ports at a bottom of the vertical support. In another exemplary embodiment, configuring the wind turbine further includes coupling the multiple blades with a hub that is in mechanical communication with the electric generator. In another exemplary embodiment, configuring the one or more air inlets includes disposing the one or more air inlets side-by-side along the width of the wing stabilizer. In another exemplary embodiment, configuring the one or more air inlets includes disposing an intervening separator between each pair of adjacent air inlets to contribute to the structural integrity of the wing stabilizer and to operate in combination with the one or more air inlets to reduce air turbulence. In another exemplary embodiment, configuring the power cable further includes configuring a circuit box to combine the electric current from one or more electric generators into a combined, useable electric current. In another exemplary embodiment, configuring the power cable further includes configuring a power cable extending from the circuit box to direct the useable electric current to the one or more electronic devices.

BRIEF DESCRIPTION OF THE DRAWINGS

The drawings refer to embodiments of the present disclosure in which.

Figure 1:
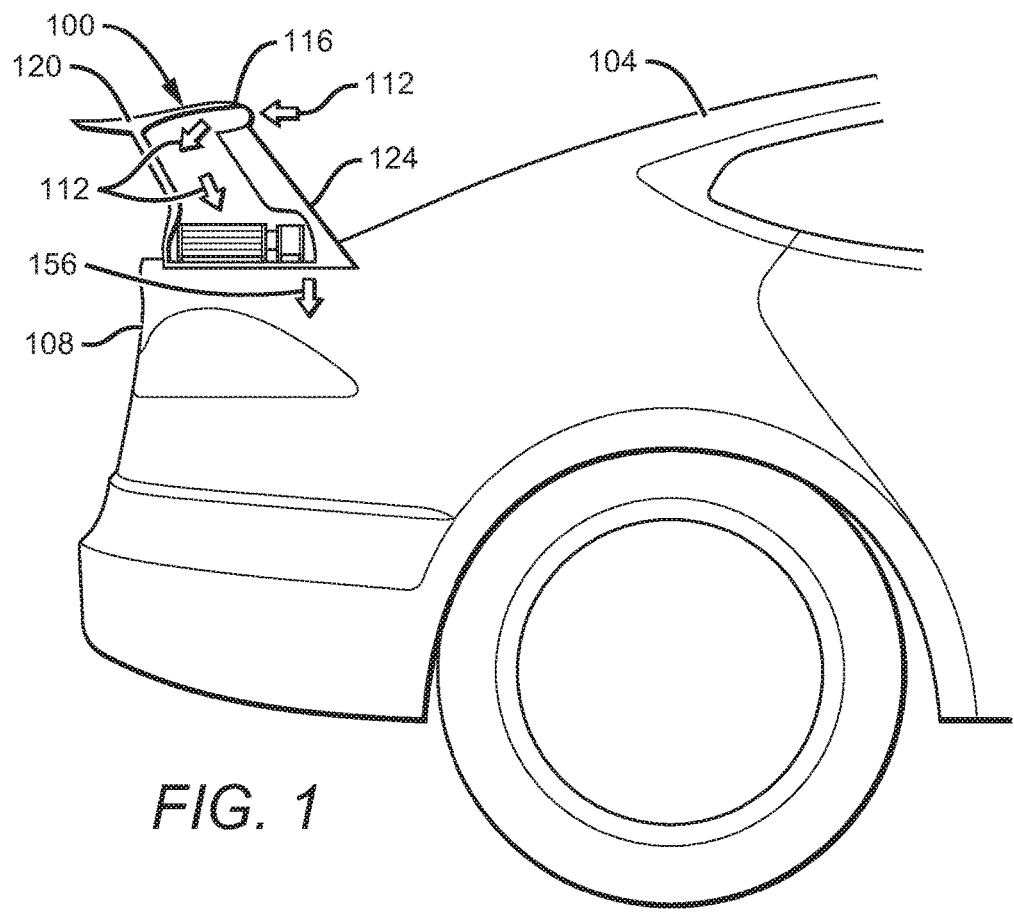
FIG. 1 illustrates a side view of an exemplary embodiment of a wing stabilizer charging system coupled with a rear of an electrically powered vehicle, in accordance with the present disclosure.

While the present disclosure is subject to various modifications and alternative forms, specific embodiments thereof have been shown by way of example in the drawings and will herein be described in detail. The invention should be understood to not be limited to the particular forms disclosed, but on the contrary, the intention is to cover all modifications, equivalents, and alternatives falling within the spirit and scope of the present disclosure.

DETAILED DESCRIPTION

In the following description, numerous specific details are set forth in order to provide a thorough understanding of the present disclosure. It will be apparent, however, to one of ordinary skill in the art that the invention disclosed herein may be practiced without these specific details. In other instances, specific numeric references such as "first battery," may be made. However, the specific numeric reference should not be interpreted as a literal sequential order but rather interpreted that the "first battery" is different than a "second battery." Thus, the specific details set forth are merely exemplary. The specific details may be varied from and still be contemplated to be within the spirit and scope of the present disclosure. The term "coupled" is defined as meaning connected either directly to the component or indirectly to the component through another component.

Further, as used herein, the terms "about," "approximately," or "substantially" for any numerical values or ranges indicate a suitable dimensional tolerance that allows the part or collection of components to function for its intended purpose as described herein.

Electrically powered vehicles generally solve problems associated with the gasoline-powered vehicles, such as environmental pollution, noise and depletion of crude oil reserves due to the increasing use of gasoline-powered vehicles. As such, electrically powered vehicles are gaining in popularity and their use is becoming increasingly widespread. Drawbacks to electrically powered vehicles include limited travel range between battery recharging and excessive time required for recharging the batteries. Increasing the driving range of electrically powered vehicles between battery recharging downtimes can significantly increase the desirability of operating electrically powered vehicles. One approach to increasing the driving range of electrically powered is by charging the batteries while the vehicle is in motion, such as by way of utilizing air currents as a motive power. Embodiments disclosed herein relate to a wing stabilizer charging system configured to be mounted onto a vehicle for recharging an onboard battery during operation of the vehicle.

FIG. 1 illustrates a side view of an exemplary embodiment of a wing stabilizer charging system 100 coupled with a rear of an electrically powered vehicle 104, in accordance with the present disclosure. The charging system 100 is configured to be coupled with a rear 108 of the vehicle 104, such that an airstream 112 incident during forward motion of the vehicle 104 is directed into one or more air inlets 116. As described herein, the airstream 112 passing through the air inlets 116 operates one or more generators whereby an electric current is produced. The electric current may be used for recharging an onboard battery or powering any of various electronic devices, as desired. It is contemplated that such electronic devices may include, but are not limited to, mobile phones or smart phones, portable music players, tablet computers, cameras, and the like.

Although the vehicle 104 shown in FIG. 1, and described herein, is of an electrically powered variety, it is contemplated that the charging system 100 of the present disclosure may be coupled with a wide variety of different vehicles. For example, the vehicle 104 may be any vehicle that includes an onboard battery, such as hybrid electric vehicles, electric vehicles, as well as various fuel-powered vehicles. In some embodiments, fuel-powered vehicles may include any of automobiles, trucks, recreational vehicles, buses, various cargo moving vehicles, locomotives, airplanes, helicopters, airships, boats and ships, and the like, without limitation.

Figure 2:
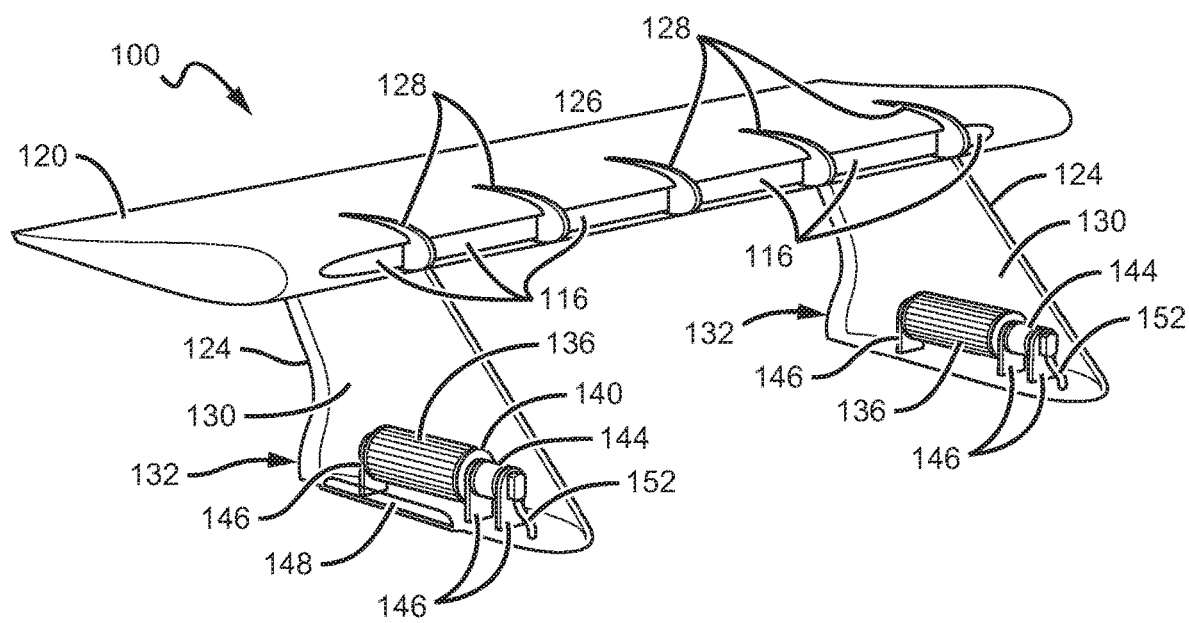
FIG. 2 illustrates an isometric ghost-view of an exemplary embodiment of a wing stabilizer charging system configured to be coupled with a rear of an electrically-power vehicle according to the present disclosure.

FIG. 2 illustrates an isometric ghost-view of the wing stabilizer charging system 100 of FIG. 1. The wing stabilizer charging system 100 comprises a wing stabilizer 120 that is configured to be coupled with the rear 108 of the vehicle 104, as shown in FIG. 1. As such, the wing stabilizer 120 generally includes a shape and size suitable for being coupled with the vehicle 104. As will be appreciated, the wing stabilizer 120 generally includes multiple mounting holes (not shown) for receiving hardware fasteners suitable for attaching the wing stabilizer 120 to the rear 108 of the vehicle 104. As such, any of the hardware fasteners, the number and locations of the mounting holes, as well as the shape and size of the wing stabilizer 120, may be varied, without limitation, so as to accommodate various makes and models of the vehicle 104.

As further shown in FIG. 2, the wing stabilizer 120 includes multiple air inlets 116 configured to receive the airstream 112 during forward motion of the vehicle 104. In the illustrated embodiment, six air inlets 116 are disposed, side by side, along the width of the wing stabilizer 120. It is contemplated, however, that in some embodiments, more than or less than six air inlets 116 may be incorporated into the wing stabilizer 120 without limitation. Further, each pair of adjacent air inlets 116 shares an intervening separator 128. The separators 128 generally are configured to contribute to the structural integrity of the wing stabilizer 120 and to operate in combination with the air inlets 116 to reduce air turbulence. It is contemplated that, in some embodiments, any of various aerodynamic shapes or features may be incorporated into wing stabilizer 120 so as to improve entry of the airstream 112 into the air inlets 116, without limitation.

With continuing reference to FIG. 2, the wing stabilizer 120 generally is a hollow, wing-shaped member that is coupled with the vehicle 104 by way of vertical supports 124 disposed on opposite ends of the wing stabilizer 120. The wing stabilizer 120 includes an interior chamber 126 that receives the airstream 112 entering through the multiple air inlets 116. The vertical supports 124 each includes an interior air passage 130 that is in fluid communication with the chamber 126. A wind turbine 132 is housed within each vertical support 124, such that the airstream 112 is communicated from the chamber 126, through the air passages 130 to each of two wind turbines 132. As such, during forward motion of the vehicle 104, the airstream 112 enters through the air inlets 116 and turns the wind turbines 132 before exiting at a bottom of the vertical supports 124. One or more air outlet ports 148 may be disposed at the bottom of the vertical supports 124 and configured to allow the airstream 112 to exit the air passages 130 after turning the wind turbines 132. While being turned, the wind turbines 132 produce electricity that may be used to recharge an onboard battery and/or power one or more portable electronic devices, as described herein.

The wind turbines 132 each includes multiple blades 136 coupled with a hub 140 that is generally concentric with an electric generator 144. As shown in FIG. 2, one or more mounts 146 may be configured to support the hub 140 and the electric generator 144 within the air passage 130. Any of various suitable bearings (not shown) may be employed, without limitation, to allow free rotation of the hub 140 and the electric generator 144 in response to the airstream 112 within the air passage 130.

It is contemplated that any suitable number of blades 136 may be coupled with the hub 140, without limitation. Each of the blades 136 includes a scooped cross-sectional shape that extends along the length of the blade 136. As such, the blades 136 are configured to turn the electric generator 144 in response to the airstream 112 flowing through the air passage 130. The blades 136 are configured, in some embodiments, to rotate the electric generator 144 in a clockwise direction for the purpose of producing electricity. It should be recognized, however, that the blades 136 may be configured, in some embodiments, to rotate the electric generator 144 in a counterclockwise direction, as may be desired. As such, the specific configuration of the blades 136 shown in FIG. 2 is not to be construed as limiting in nature, and thus the blades 136 may be altered to accommodate a wide variety of makes and models of the electric generator 144, without limitation.

In general, during forward motion of the vehicle 104 the airstream 112 passes through the air inlets 116 into the chamber 126. The airstream 112 then passes through the vertical supports 124 by way of the air passages 130, wherein the airstream 112 advantageously causes the blades 136 and the electric generators 144 to rotate. As mentioned hereinabove, the electric generators 144 are configured to produce an electric current during rotating. Each electric generator 144 includes a power cable 152 that is configured to convey an electric current 156 (see FIG. 1) from the electric generator 144 to one or more electronic devices configured to utilize the electric current 156, such as an onboard battery configured to power the vehicle 104.

In some embodiments, wherein the wing stabilizer charging system 100 includes multiple electric generators 144, such as the embodiment illustrated in FIG. 2, the electric currents 156 may be directed from the electric generators 144 to a circuit box that includes electric circuitry configured to combine the electric currents 156 into a combined, useable electric current. In some embodiments, the circuit box may be configured to synchronize AC electric currents received from the electric generators 144 to form the useable electric current. In some embodiments, the circuit box may include at least one rectifier configured to convert AC electricity received from the electric generators 144 into DC electricity in the form of the useable electric current. Further, in some embodiments, wherein the electric generators 144 are configured to generate DC currents, the circuit box may be configured to combine the received DC currents to form the useable electric current.

Embodiments of the wing stabilizer charging system 100 that include the circuit box, as described above, may include a power cable that is configured to carry the useable electric current from the circuit box to any one or more electronic devices that are configured to utilize the current. It is contemplated that the useable electric current may be used for recharging an onboard battery or powering any of various electronic accessory devices, including, but not limited to, mobile phones or smart phones, portable music players, tablet computers, cameras, and the like. It is contemplated that the power cable and the circuit box may be implemented in a wide variety of configurations other than those specifically described herein, without limitation, and without deviating beyond the spirit and scope of the present disclosure.

While the invention has been described in terms of particular variations and illustrative figures, those of ordinary skill in the art will recognize that the invention is not limited to the variations or figures described. In addition, where methods and steps described above indicate certain events occurring in certain order, those of ordinary skill in the art will recognize that the ordering of certain steps may be modified and that such modifications are in accordance with the variations of the invention. Additionally, certain of the steps may be performed concurrently in a parallel process when possible, as well as performed sequentially as described above. To the extent there are variations of the invention, which are within the spirit of the disclosure or equivalent to the inventions found in the claims, it is the intent that this patent will cover those variations as well. Therefore, the present disclosure is to be understood as not limited by the specific embodiments described herein, but only by scope of the appended claims.

What is claimed is:

1. A charging system for a vehicle, the charging system comprising:
    a wing stabilizer coupled with a rear of an electrically powered vehicle comprising a hollow wing-shaped member including an interior chamber;
    one or more air inlets disposed in the wing stabilizer and configured to receive an airstream into the chamber during forward motion of the vehicle wherein the one or more air inlets have a separator configured to contribute to reduction of air turbulence;

at least a generator operated by the one or more air inlets;

a vertical support disposed near each end of the wing stabilizer and mounted to a rear of the vehicle;

an air passage within each vertical support and in fluid communication with the chamber;

a wind turbine disposed within the air passage and configured to be turned by the airstream; and a power cable configured to direct an electric current from the wind turbine to one or more electronic devices that are configured to utilize the electric current.

2. The charging system of claim 1, wherein the one or more electronic devices comprises any of an onboard battery for powering the vehicle, mobile phones or smart phones, portable music players, tablet computers, cameras, and the like.

3. The charging system of claim 1, wherein the wing stabilizer includes a shape and size suitable for being coupled with the rear of the vehicle.

4. The charging system of claim 1, wherein the wing stabilizer includes multiple mounting holes for receiving hardware fasteners suitable for attaching the wing stabilizer to the rear of the vehicle.

5. The charging system of claim 1, wherein the one or more air inlets are disposed side-by-side along the width of the wing stabilizer.

6. The charging system of claim 5, wherein each pair of adjacent air inlets shares an intervening separator that is configured to contribute to the structural integrity of the wing stabilizer and to operate in combination with the one or more air inlets to reduce air turbulence.

7. The charging system of claim 1, wherein one or more air outlet ports are disposed at a bottom of each vertical support and configured to allow the airstream to exit the wing stabilizer.

8. The charging system of claim 1, wherein the wind turbine includes multiple blades coupled with a hub that is in mechanical communication with an electric generator.

9. The charging system of claim 8, wherein the multiple blades generally are arranged in a cylindrical configuration.

10. The charging system of claim 8, wherein each of the multiple blades includes a scooped cross-sectional shape that extends along the length of the blade.

11. The charging system of claim 8, wherein the multiple blades are configured to turn the electric generator in response to the airstream entering through the one or more air inlets and exiting through one or more air outlet ports at a bottom of the vertical support.

12. The charging system of claim 1, further including a circuit box configured to combine the electric current from one or more electric generators into a combined, useable electric current.

13. The charging system of claim 12, further including a power cable extending from the circuit box and configured to direct the useable electric current to the one or more electronic devices.

14. A method for a charging system for a vehicle, the method comprising:

configuring a wing stabilizer comprising a hollow wing-shaped member that includes an interior chamber;

disposing one or more air inlets in the wing stabilizer including a plurality of adjacent air separators configured to reduce air turbulence;

configuring the one or air inlets to direct an airstream into the chamber during forward motion of the vehicle;

disposing a vertical support near each end of the wing stabilizer;

configuring the vertical support to be mounted to a rear of the vehicle;

placing an air passage within each vertical support into fluid communication with the chamber;

disposing a wind turbine within the air passage;

configuring the wind turbine to be turned by the airstream;

providing at least a generator connected to the onboard battery for powering said battery; and configuring a power cable to direct an electric current from the wind turbine to one or more electronic devices that are configured to utilize the electric current.

15. The method of claim 14, wherein configuring the wind turbine includes configuring multiple blades to turn an electric generator in response to the airstream entering through the one or more air inlets and exiting through the one or more air outlet ports at a bottom of the vertical support.

16. The method of claim 15, wherein configuring the wind turbine further includes coupling the multiple blades with a hub that is in mechanical communication with the electric generator.

17. The method of claim 14, wherein configuring the one or more air inlets includes disposing the one or more air inlets side-by-side along the width of the wing stabilizer.

18. The method of claim 17, wherein configuring the one or more air inlets includes disposing an intervening separator between each pair of adjacent air inlets to contribute to the structural integrity of the wing stabilizer and to operate in combination with the one or more air inlets to reduce air turbulence.

19. The method of claim 14, wherein configuring the power cable further includes configuring a circuit box to combine the electric current from one or more electric generators into a combined, useable electric current.

20. The method of claim 19, wherein configuring the power cable further includes configuring a power cable extending from the circuit box to direct the useable electric current to the one or more electronic devices.

* * * * *